United States Patent [19]

Suzuoka et al.

[11] 4,370,302

[45] Jan. 25, 1983

[54] MACHINE FOR SOLID PHASE POLYMERIZATION

[75] Inventors: Akihiro Suzuoka; Toshifumi Okuhira; Eiji Matsumura; Katsushi Sasaki, all of Matsuyama, Japan

[73] Assignee: Teijin Limited, Osaka, Japan

[21] Appl. No.: 221,204

[22] Filed: Dec. 30, 1980

[30] Foreign Application Priority Data

Jan. 4, 1980 [JP] Japan .......................... 55-7
Jan. 4, 1980 [JP] Japan .......................... 55-9
Aug. 22, 1980 [JP] Japan .................. 55-114670

[51] Int. Cl.³ .................... B01J 4/00; B01J 19/20; C08G 63/02
[52] U.S. Cl. .................... 422/137; 366/139; 366/310; 422/131; 422/233; 422/135; 422/225; 528/484
[58] Field of Search ............... 422/131, 135, 136, 137, 422/219, 233, 225; 366/309, 310, 312, 319, 320, 139; 198/670, 676; 528/309, 484

[56] References Cited

U.S. PATENT DOCUMENTS

| | | | |
|---|---|---|---|
| 2,080,542 | 5/1937 | Kuss et al. | 366/319 X |
| 2,885,246 | 5/1959 | De Haven | 422/131 X |
| 3,238,122 | 3/1966 | Hagerbaumer | 422/219 X |
| 3,248,180 | 4/1966 | Kilpatrick | 422/137 |
| 3,253,892 | 5/1966 | Brignac et al. | 422/137 |
| 3,779,712 | 12/1973 | Calvert et al. | 422/131 X |

*Primary Examiner*—Michael S. Marcus
*Attorney, Agent, or Firm*—Burgess, Ryan and Wayne

[57] ABSTRACT

A machine for solid phase polymerization comprises: a system for supplying particles of a synthetic polymer; a reaction system for effecting solid phase polymerization of the particles, fed from the supplying system, under a vacuum and heated condition; and a system for discharging the solid phase polymerized particles. The supplying system includes a pre-treatment apparatus comprising: a pre-crystallizer of a vertical agitator type; and a beater of a horizontal type. The reaction system includes a horizontal reaction vessel having a horizontal rotary shaft with a helically formed screw vane. The screw vane has a multiplicity of small through-apertures, and scrapers extend axially extending between adjacent screw vane portions. Intermediate pots having specially designed vacuum breakers are disposed at locations between the reaction system and the supplying system and between the reaction system and the discharging system.

4 Claims, 4 Drawing Figures

MACHINE FOR SOLID PHASE POLYMERIZATION

FIELD TO WHICH THE INVENTION RELATES

The present invention relates to a machine by which solid state polymer is continuously polymerized in a solid phase, which machine will be referred to as a machine for solid phase polymerization hereinbelow. More specifically, the present invention relates to a machine for solid phase polymerization comprising: a system for supplying particles which are often called chips, of a polymer such as polyester or polyamide; a reaction system to which the particles are continuously fed from said supplying system and in which they are subjected to a solid phase polymerization; and a system for discharging the particles which have been polymerized under solid phase in the reaction system so that their degree of polymerization is increased.

In general, synthetic fibers, for example polyester fiber, which are used as industrial materials must have high strength, and accordingly, the degree of polymerization of, for example, polyester chips used for such fibers must be highly increased. Therefore, processes have been developed wherein particles obtained through conventional melt polymerization, having a predetermined degree of polymerization, are further subjected to a solid phase polymerization in order to increase their degree of polymerization.

BACKGROUND OF THE INVENTION

Conventional machines for solid phase polymerization are roughly classified into two types. One is a batch type machine, such as a rotary cylinder type or a tumbler type, and the other is a continuous type machine, such as that having a helical vane for agitating and feeding or having a plurality of rotary discs. However, generally speaking when such machines are used for solid phase polymerization of, for example, polyester particles, which are usually formed in a cylinder or a polygonal prism, which have a width and a length of between 2 and 6 mm, and which are called chips, generation of stuck chips wherein chips are stuck to each other, cannot be avoided. Therefore, the produced chips withdrawn from a conventional machine for solid phase polymerization are selected by passing them through a sieve. However, the conventional machine is disadvantageous in that the quantity of stuck chips is very large, and accordingly, productivity thereof is low. Especially, in a continuous type machine, such a problem often occurs because time for pre-crystallization is short, and if a selection system utilizing a sieve is applied, the continuity of the process is disturbed.

Tumblers, wherein a vacuum seal can be made most easily among the above-explained systems, have also been widely utilized as machines for solid phase polymerization. However, since such tumblers along to a batch type, their production capacity per unit time is small since a long reaction time is required. In addition, their operation is troublesome and an uneveness occurs in the quality of the obtained chips between the batches.

SUMMARY OF THE INVENTION

An object of the present invention is to provide a machine for solid phase polymerization in which the quantity of the generated stuck chips is small, and accordingly, high productivity can be obtained.

Another object of the present invention is to provide a machine for solid phase polymerization which has a large capacity and whose operation is very easy.

In the present invention, these objects are achieved by a machine for solid phase polymerization which comprises: a system for supplying particles of a synthetic polymer; a reaction system for effecting solid phase polymerization under a vacuum and heated conditions, of particles of a synthetic polymer fed from the supplying system; and a system for discharging the particles of a synthetic polymer which have been subjected to the solid phase polymerization in the reaction system.

In the present invention, to obviate the disadvantages of small capacity and a long reaction time involved in conventional batch type machines for solid phase polymerization, the reaction system, wherein particles of a synthetic polymer are continuously polymerized under heat and vaccum, comprises: a horizontal reaction vessel; a shaft rotatable about a horizontal axis within the reaction vessel; at least one screw vane helically secured to the rotatable shaft and having a multiplicity of small through apertures formed therein; and scrapers axially extending between the adjacent screw vane portions. In addition, to continuously feed particles into the reaction system wherein a vacuum condition is kept at a predetermined level and to discharge the particles having been subjected to the solid phase polymerization, intermediate vessels or pots are disposed at locations between the reaction system and the supplying system and between the reaction system and the discharging system, respectively, and vacuum breakers comprising particle shutters located upward and vaccum valves located downward are disposed at the particle supply sides and the particle discharge sides of the intermediate vessels, respectively. The supply and discharge of the particles between the system in the vacuum and the outside thereof are effected via the intermediate vessles having the vacuum breakers. Due to the specially designed construction, the clogging of particles, especially chips of a polymer, such as polyester, between the sealing surfaces of conventional vacuum valves can be avoided, and therefore, the continuous vacuum operation can be effected without any substantial interruption. Furthermore, in the present invention, a pre-treatment apparatus comprising a pre-crystallizer and a beater, connected to the exit of the pre-crystallizer, for separating stuck chips into separate chips is disposed in the supply system, and particles of a synthetic polymer are dried and beated in the pre-treatment apparatus and then are fed to a heated vacuum vessel located in the reaction system.

BRIEF DESCRIPTION OF THE INVENTION

Some embodiments of the present invention will now be explained with reference to the accompanying drawings, wherein.

DETAILED DESCRIPTION OF THE INVENTION

Figure 1:
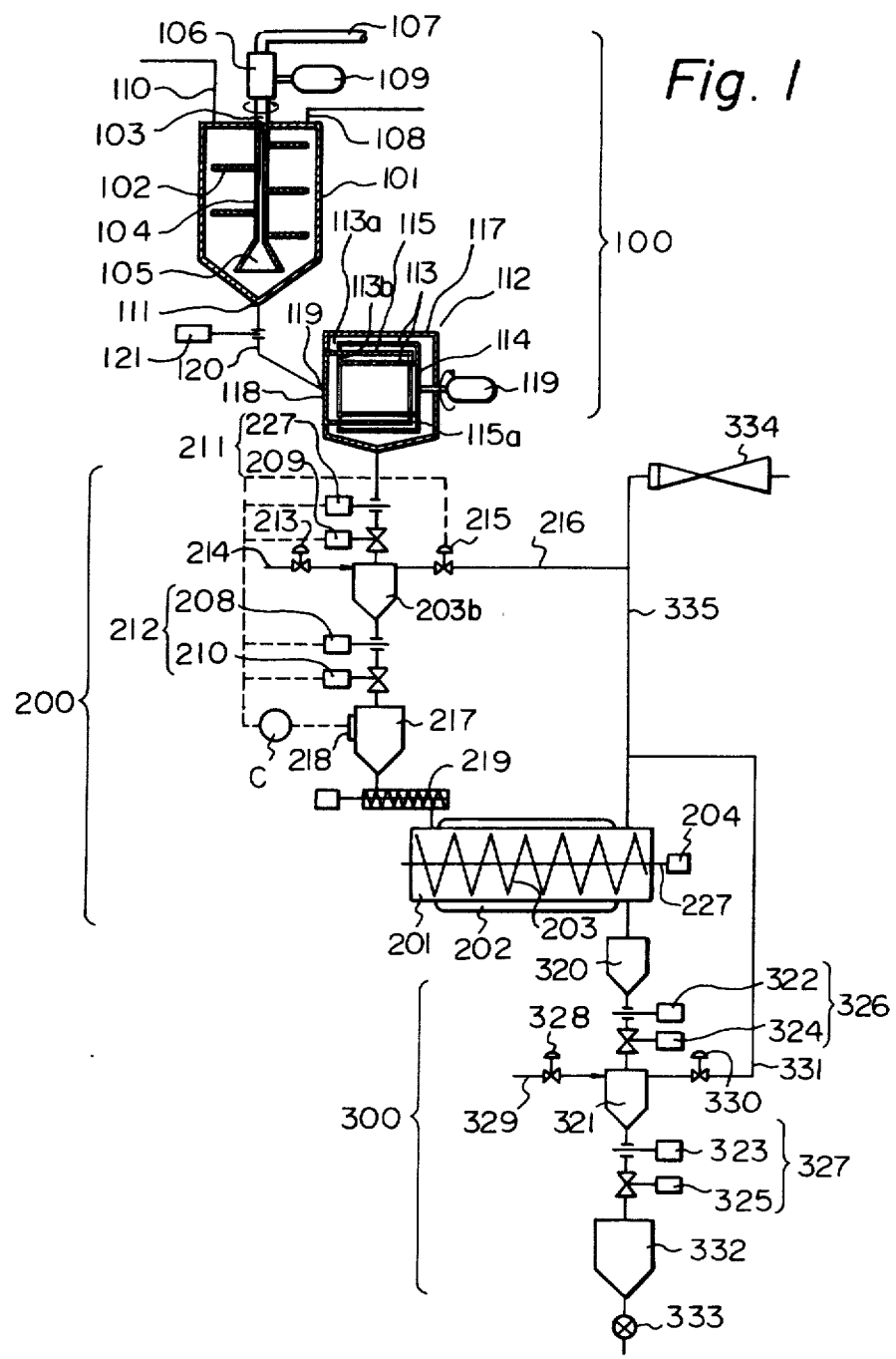
FIG. 1 is a flow diagram of a machine for solid phase polymerization according to the present invention.

In FIG. 1, a machine for solid phase polymerization according to the present invention comprises: a supplying system 100 for pre-crystallizing particles of a synthetic polymer and for supplying them; a reaction system 200 wherein the particles of a synthetic polymer fed from the supplying system 100 are subjected to a solid phase polymerization under vacuum so that the degree of polymerization of the particles is increased; and a system 300 for discharging the particles of a synthetic polymer from the reaction system.

The supplying system will now be explained in detail. A pre-crystallizer 101 formed by a vertical vessel has a plurality of agitating bars 102 fixed on a hollow vertical spindle 103. The hollow vertical spindle 103 has an elongated hole 104 axially extending therein and connected to an opening 105 for blowing hot air located at the lower end thereof. The upper end of the hollow vertical spindle 103 is rotatably supported by a conventional bearing box 106 and connected to a rotary coupling (not shown) communicating with a hot air conduit 107, and the vertical spindle 103 is rotated about a vertical axis by an electric motor 109 via gears or chains. The hot air conduit 107 is supplied with hot air from a heat source (not shown), and the hot air is blown through the lower opening 105 toward the bottom of the pre-crystallizer 101. An exit 108 for discharging hot air is formed on the upper portion of the pre-crystallizer 101, and in some cases, the exit 108 may be communicated with the heat source via a recirculating conduit (not shown) so that the discharged hot air is recirculated. In addition, the pre-crystallizer 101 has a portion 110 for supplying chips formed at the upper portion thereof and a port 111 for discharging chips formed at the bottom thereof. A beater 112 is disposed at a location beneath the pre-crystallizer 101 and comprises a basket 114 rotatable about a horizontal axis by means of an electric motor not shown. A plurality of movable rods 113 horizontally projecting from the rotary basket 114 are arranged along two circles which are coaxial with each other about the horizontal axis. The front ends of the movable rods 113 are connected to two coaxial ring plates 113a and 113b. A plurality of stationary rods 115 fixed on a cover plate 118 are arranged along a circle coaxial with the above-mentioned circles so that they are inserted between the movable rods 113. The front ends of the stationary rods 115 are connected to a ring plate 115a. Reference numeral 117 denotes an outer wall of the beater 112.

The discharge port 111 of the pre-crystallizer 101 and an entrance port 119 formed on the cover plate 118 of the beater 112 communicate with each other by means of a communicating pipe 120 wherein an electrically movable shutter 121 is disposed.

The reaction system 200 will now be explained with reference to FIG. 1. A vacuum reactor 201 which is the main apparatus of the reaction system 200 comprises: a horizontal vessel having a jacket 202 filled with a thermal medium for heating it formed at the outside thereof; and a horizontal shaft 207 connected to a drive electric motor 204, rotatably supported in the vessel and having a screw vane 203 helically arranged around the shaft 207. A series of vacuum reactors 201 having a similar construction to that explained above may be disposed in series.

Between the beater 112 of the above-explained supplying system and the vacuum reactor 201, an intermediate vessel 206, a supply hopper 217 and a screw feeder 219 for feeding chips continuously, are arranged in sequence. An apparatus for preheating chips may be arranged between the screw feeder 219 and the vacuum reactor 201, if such an apparatus is necessary to increase the temperature of the chips in the vacuum reactor 201. At the supply side and the discharge side of the intermediate vessel 206, i.e., at a location between the beater 112 and the intermediate vessel 206 and a location between the intermediate vessel 206 and the supply hopper 217, vacuum breakers 211 and 212 comprising particle shutters 227 and 208 located upwards the vacuum valves 209 and 210 located downwards are arranged. The intermediate vessel 206 is connected to a conduit 214 for supplying nitrogen which accommodates an automatic valve 213 and a conduit for supplying vacuum which also accommodates an automatic valve 215. The supply hopper 217 has a conventional level detecting device 218 which detects the level of particles therein. A set of sequence circuits are arranged between the intermediate vessel 206 and the supply hopper 217 via a controller C, so that first the level detecting device 218 detects the fact that the level of particles in the supply hopper 217 is lowered to a predetermined level and then the automatic valves 213 and 215 and the vacuum breakers 211 and 212 are actuated in order to feed a certain amount of particles into the supply hopper 217.

In some cases a tank (not shown) having a sufficient volume to continuously receive chips discharged from the beater 112 and to store them therein may be disposed between the beater and the uppermost vacuum breaker 211.

The discharge system 300 will now be explained referring to FIG. 1. At the discharge side of the vacuum reactor 201, a storage vessel 320, an intermediate vessel 321 and a cooling tank 332 for ceasing further crystallization of produced chips are successively arranged beneath the vacuum reactor 201. The intermediate vessel 321 has a vacuum breaker 326 comprising a particle shutter 322 and a vacuum valve 324 disposed at the entrance thereof and a vacuum breaker 327 comprising a particle shutter 322 and a vacuum valve 325 disposed at the exit thereof similar to the arrangement of intermediate vessel 206. Furthermore, the intermediate vessel 321 is connected to a conduit 329 for supplying nitrogen which includes an automatic valve 328 and is also connected to a conduit 331 using a vacuum which includes an automatic valve 330. A rotary valve 333 for controlling the discharge of the produced chips is disposed at the discharge side of the cooling tank 332. Reference numeral 334 denotes a steam ejector which communicates with the vacuum reactor 201 via a vacuum conduit 335.

Figure 2:
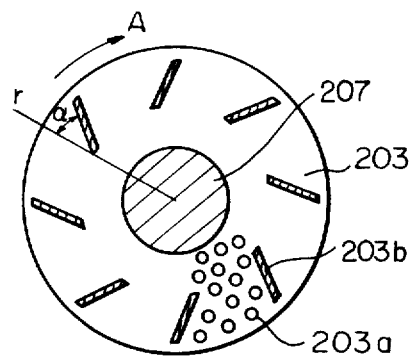
FIGS. 2 and 3 are elevational and side views illustrating the details of a screw vane illustrated in FIG. 1.

The construction of the vacuum reactor 201 will now be further explained. In FIG. 2, the screw vane 203 is helically secured to the periphery of the horizontal rotatable shaft 207 and has such a size, that the circumference of the screw vane 203 is located close to the inner surface of the vacuum reactor 201 or is in contact with the inner surface. The entire surface of the screw vane 203 has a multiplicity of small through-apertures 203a formed therein, only a part of which are illustrated in FIG. 2. Furthermore, a plurality of scrapers 206 disposed at radially outside locations of the screw vane 203 axially extend across spaces called screw grooves 205 formed between the adjacent portions of the screw vane 203.

Referring to FIG. 1, in the machine for solid phase polymerization of the present invention, chips which, for example, have an I.V., i.e., intrinsic viscosity, of 0.6 are supplied continuously or intermittently from a storage tank (not shown) to the pre-crystallizer 101 of the supplying system 100. The chips are heated to a temperature, for example, of between 130° and 180° C. for polyethylene terephthalate, by means of hot air blown through the opening 105 formed at the lower end of the rotatable vertical spindle 103 while they are agitated by means of the agitating bars 102 fixed on the rotatable vertical spindle 103, and accordingly, they are uniformly heated and dried and the preliminary crystallization of the chips are effected. In this case, it is preferable that the distance of the crystallization from the surface of chips, i.e., crystallized depth of chips be at least 40 μm. If a crystallized depth of at least 40 μm is obtained in the chips at a temperature mentioned above, the sticking of the chips in the subsequent polymerization process wherein they are subjected to a reaction temperature of, for example, between 150° and 230° C. can be avoided. After the chips are subjected to the above-explained preliminary crystallization procedure, a large quantity of stuck chips may be created, however such stuck chips created through the preliminary crystallization procedure are different from those created through the solid phase polymerization and can be separated from each other when a low shearing force is applied.

To separate stuck chips created in the pre-crystallizer 101 by applying a shearing force thereto, in the present invention, the beater 112 is disposed after the pre-crystallizer 101. The chips which have been crystallized to a predetermined depth in the pre-crystallizer 101 are introduced into a basket which is rotating at a high speed about the horizontal axis through the communicating pipe 120 and the entrance port 119 of the beater 112 by means of the actuation of the shutter 121. The chips introduced within the basket 114 are exposed to a shearing force when they pass by the movable rods 113 rotating with the basket 114 and the stationary rods 115 located between the movable rods 113, and accordingly, the stuck chips are separated from each other into individual chips.

When the level detecting device 218 mounted on the supply hopper 217 disposed beneath the beater 112 detects the fact that the level of chips in the supply hopper 217 is lower than a predetermined level, the automatic valve 213 is actuated to open by a detecting signal, and therefore, nitrogen gas is supplied into the intermediate vessel 206. At this moment, all of the shutters 227 and 208, the vacuum valves 209 and 210, and the automatic valve 215 are closed.

After the intermediate vessel 206 is filled with nitrogen gas, the automatic valve 213 is closed, and thereafter, the vacuum valve 209 is first open and then, for example after several seconds from the opening of the vacuum valve 209, the shutter 227 is open, so that chips drop into the intermediate vessel 206.

After a predetermined time period elapsed, i.e., after a predetermined quantity of chips are introduced into the intermediate vessel 206, in this case, the shutter 227 is first closed, and then the vacuum valve 209 is closed. The operation of the vacuum breaker 211 may be effected by means of a set of timers or by means of a level detecting device (not shown) mounted on the intermediate vessel 206.

When the vacuum valve 209 is closed, the automatic valve 215 is open so that the inside of the intermediate vessel 206 is brought to a vacuum state substantially the same as that in the vacuum reactor 201. After a predetermined vacuum level is achieved, the automatic valve 215 is closed.

Thereafter, the vacuum breaker 212 is actuated, more specifically, the vacuum valve 210 is open, and successively after several seconds, the shutter 208 is open so that the chips having been stored within the intermediate vessel 206 are fed into the supply hopper 217. After the feed of the chips is completed, the shutter is closed, and then, the vaccum valve 210 is closed. The procedures similar to those explained above are repeated, so that the chips which have been subjected to preliminary crystallization are intermittently fed to the supply hopper 217 through the intermediate vessel 206 and the procedures are temporarily stopped when the level detecting device 218 detects the fact that the level of the chips in the supply hopper 217 reaches the upper limit when a storage tank (not shown) is disposed between the beater and the uppermost vacuum breaker 211, the chips in the beater 112 may be continuously discharged into the intermediate vessel 206 and fluctuations in the process can be reduced.

The chips fed to the supply hopper 217 are then continuously fed to the vacuum crystallizer 201 by means of the screw feeder 219. In the vacuum reactor 201, the chips are subjected to a high temperature of between 150° and 230° C., for example of 230° C., and a high vacuum of between 0.5 and 2 Torr, for example 1 Torr, and are gradually transferred while they are agitated and mixed, and after storage therein for a predetermined time period, they are polymerized in a solid phase. More specifically, the inside of the vacuum reactor 201 is heated at a constant high temperature of between 150° and 230° C. by means of the heating jacket 202 and is maintained at a high vacuum of between 0.5 and 2 Torr by means of the steam ejector 334, and the chips fed into the vacuum reactor 201 are axially transferred toward the exit thereof, i.e., to the right in FIG. 1, by means of the rotation of the screw vane 203. In this case, since the screw vane 203 has a multiplicity of small through-apertures 203a formed therein, only a part of the chips can be radially moved together with the screw vane 203 and the remaining part of the chips remain without substantially being transferred, and accordingly, the mixing of the chips is highly enhanced, and the feed of the chips as a whole becomes small. Furthermore, since scrapers 203b are formed between the facing portions of the screw vanes 203, a part of the chips are scraped and are then dropped while the scrapers 203b are rotated at certain angles during a quarter or a half a revolution from their lowermost locations. The chips, which are scraped and drop, remain at substantially the same locations, in other words, the chips substantially do not move along the axial direction, and accordingly, the agitation of the chips in the same screw groove 205 effectively takes place and the mixing efficiency of the chips is high and the uniformity of the chips is guaranteed. In addition, the chips are transferred along the scrapers 203b in a thin layer, and accordingly, the surface area of the entire layered chips is increased. As a result, the diffusion of the moisture involved in the chips can be effectively achieved, and the reaction speed is also increased.

The chips are gradually moved axially toward the exit thereof, i.e., to the right in FIG. 1 while they are agitated and mixed, and during this transferring process, the degree of the polymerization of the chips is gradually increased due to the proceeding of the polymerizing reaction, and accordingly, after several hours, for example, after a time of between 4 and 8 hours elapse, the chips which have obtained a desired degree of polymerization reach the exit of the vacuum crystallizer from where they are discharged.

Figure 3:
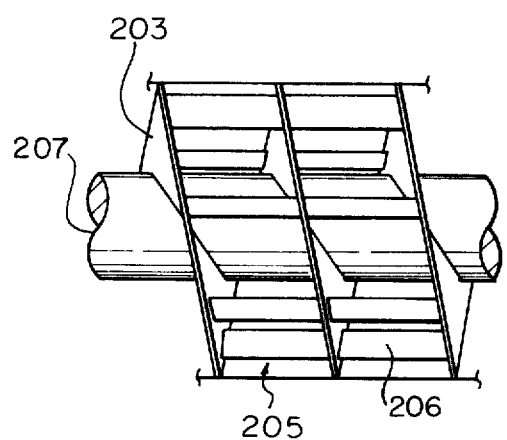
Figure 4:
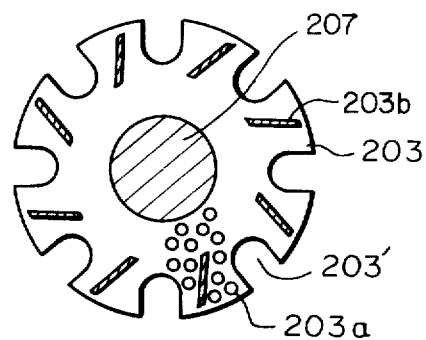
FIG. 4 is an elevational view of another embodiment.

It is preferable that as illustrated in FIG. 2 the scrapers 203b are arranged in such a manner that they slightly incline toward the rotational direction denoted by arrow A of the screw vane 203 by an angle a from the radial direction denoted by line r so that chips can be scraped easily and so that the scraped chips can drop rather rapidly. Furthermore, the area and the number of the through-apertures 203a formed in the screw vane 203 are so selected that the passing of the chips therethrough and the flow of gas therethrough, i.e., the suction of the vacuum, can be appropriate. In addition, to further decrease the feeding speed of chips in the vacuum reactor 201 and to increase the mixing of chips, as illustrated in FIG. 4 notches 203' may be formed at the periphery of the screw vane 203 as illustrated in FIG. 3. It is also preferable that an apparatus (not shown) for heating chips is arranged between the screw feeder 219 and the vacuum reactor 201, so that the chips are pre-heated to a certain temperature and then are supplied into the vacuum reactor 201.

As explained above, in the reaction system according to the present invention, mixing of chips can be facilitated and the surface of a mass of chips can effectively be exposed to the crystallizing atmosphere, and accordingly, the reaction time can be shortened and chips having a uniform and superior quality can be reliably obtained.

Then, the chips are discharged as follows. The shutters 322 and 323, the vacuum valves 324 and 325, and the automatic valves 328 and 330 are all in their closed positions, and then, the automatic valve 330 is first open so that the intermediate vessel 321 is brought into vacuum condition substantially the same as that in the vacuum reactor 201. After the suction of vacuum is completed, the automatic valve 330 is closed, and then, the vacuum valve 324 is open, and after several seconds, the shutter 322 is open so that chips which have been stored in the storage vessel 320 are dropped into the intermediate vessel 321. When the drop of chips is completed, the shutter 322 is first closed, and then, after several seconds, the vacuum valve 324 is closed. Thereafter, the automatic valve 328 is open so that nitrogen gas is introduced into the intermediate pot 321 which is thus exposed to an atmosphere of nitrogen instead of a vacuum.

Thereafter, the vacuum valve 325 and then the shutter 323 are successively open so that the chips which have been in the intermediate vessel 321 are discharged into the cooling tank 332. When the discharge of chips is completed, the shutter 323 is closed, and after several seconds elapse, the vacuum valve 325 is closed. Procedures similar to those explained above are repeated, and accordingly, the chips which have been stored in the storage vessel 320 are intermittently discharged into the cooling tank 332. The discharge of chips can be controlled by utilizing timers by which a series of a predetermined control program are carried out. However, other means for controlling the program may be used in place of the timers. For example, a level detecting device may be mounted on the storage vessel 320 so that the detecting device detects the fact that the level of chips in the storage vessel 320 reaches a predetermined level in order to actuate the vacuum breaker 326. As mentioned above, since the intermediate vessels with vacuum breakers comprising shutters and vacuum valves located at the supply and discharge sides thereof are arranged in the present invention, problems in that chips are clogged within the vacuum valves and in that accordingly the seal ability of the valves are decreased can be prevented from occurring, and therefore, the supply and discharge of chips can take place smoothly for a long period.

Some embodiments of the present invention have been explained herebefore. However, the present invention is not limited to the instruments and operations explained in conjunction with the above-explained embodiments. Many alterations are possible, for example, the pre-crystallizer may be a horizontal agitating type, and the beater may be a centrifugal filter type.

As explained above, according to the present invention, a pre-treatment apparatus comprising a pre-crystallizer and a beater connected to the pre-crystallizer is disposed in a supplying system of a machine for solid phase polymerization. In this machine, chips of a pre-polymer are once preliminarily dried and preliminarily crystallized before they are supplied into the vacuum dryer in a reaction system wherein they are subjected to a solid phase polymerization, and then, they are introduced into a beater where stuck chips which have been stuck to each other through the preliminary crystalization are separated from each other into separate chips. Accordingly, further sticking of the chips does not occur while they are subjected to a solid phase polymerization in the reaction system, and therefore, evenness in the degree of polymerization of chips can be achieved, and produced chips having a uniform quality can reliably be obtained. In addition, in the machine of the present invention, the polymerizing speed increases and productivity is greatly increased. Therefore, the present invention has remarkable advantages.

The shutter of the present invention has such a function to shut out the flow of particles but is not required to have a seal ability against any fluid. The shutter may be a slide type plate whose sides are supported by U-shaped guides as is generally utilized in this field. In addition, a rotary feeder or a screw feeder which can shut out particles may be used as a shutter of the present invention.

The valve, i.e., vacuum valve, of the present invention must have a function to shut out the flow of fluid and must be a valve having a superior seal ability and is utilized for shutting the vacuum. However, the construction of the valve is not limited.

The functions of the shutter and the vacuum valve of the present invention are explained above, and with respect to the sealing ability between the inside of the passage and the outside of the passage, the vacuum valve naturally must have sealing ability and the shutter, especially that designated by 208 or 322 and located at a position near the vacuum valve must have a superior sealing ability between the inside of the passage and the outside of the passage similar to that of the vacuum valve. The operational relationship between the shutter and the vacuum valve is such that, after either the shutter or the vacuum valve is open or closed, the remaining vacuum valve or shutter is open or closed, and accordingly, the clogging of chips between the vacuum valve can be prevented completely.

As explained above, according to the present invention, intermittent supply and discharge of chips relative to the reactor kept in a vacuum condition can smoothly and assuredly be effected under a condition wherein the communication between the inside and outside of the reactor is broken, and accordingly, the continuous crystallization of particles under a high vacuum can effectively and reliably be effected for a long period of time.

We claim:

1. A machine for solid phase polymerization comprising means defining a system for supplying particles of a synthetic polymer, means defining a reaction system for effecting solid phase polymerization under a vacuum and heated conditions to said particles of a synthetic polymer fed from said supplying system, and means defining a system for discharging said particles of a synthetic polymer which have been subjected to said solid phase polymerization in said reaction system so that their degree of polymerization is increased, characterized in that said reaction system comprises a horizontal reaction vessel, a shaft rotatable about a horizontal axis within said reaction vessel, at least one screw vane secured to said rotatable shaft and having a multiplicity of small apertures formed therein, and scrapers axially extending between adjacent screw vane portions, said supplying system comprises a pre-treatment apparatus comprising a precrystallizer wherein particles are pre-crystallized and a beater for separating stuck particles connected to the exit of said precrystallizer, whereby said particles of a synthetic polymer are precrystallized and beaten by means of said pre-treatment apparatus and then are fed to said reaction system, said machine further comprising intermediate vessels disposed for communication between said reaction system and said discharging system, respectively, and vacuum breakers comprising particle shutters and vacuum valves located downstream of said shutters disposed at the particle supply side and the particle discharge side of said intermediate vessels, respectively.

2. A machine for solid phase polymerization according to claim 1, characterized in that said beater comprises a rotary basket rotatable about a horizontal axis, movable rods horizontally projecting from said rotary basket and disposed along two circles coaxial with each other about said horizontal axis, and a plurality of stationary horizontal rods inserted into a space between said two coaxial circles.

3. A machine for solid phase polymerization according to claim 1, characterized in that said pre-crystallizer comprises a vertical vessel communicating with an external heat source so that hot air is fed into said vertical vessel, a vertical spindle rotatable about a vertical axis within said vertical vessel, and a plurality of agitating bars fixed on said vertical spindle.

4. A machine for solid phase polymerization according to claim 1, characterized in that: said pre-crystallizer comprises a vertical vessel communicating with an external heat source so that hot air is fed into said vertical vessel, a vertical spindle rotatable about a vertical axis within said vertical vessel, and a plurality of agitating bars fixed on said vertical spindle; and said beater comprises a rotary basket rotatable about a horizontal axis, movable rods horizontally projecting from said rotary basket and disposed along two circles coaxial with each other about said horizontal axis, and a plurality of stationary horizontal rods inserted into a space between said two coaxial cables.

* * * * *